United States Patent
Cook et al.

(10) Patent No.: US 6,178,045 B1
(45) Date of Patent: *Jan. 23, 2001

(54) SPATIAL FILTER FOR HIGH POWER LASER BEAM

(75) Inventors: Thomas A. Cook, Corning; Robert A. Modavis, Painted Post, both of NY (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/081,912

(22) Filed: May 19, 1998

Related U.S. Application Data

(60) Provisional application No. 60/047,859, filed on May 29, 1997.

(51) Int. Cl.⁷ .................................................. G02B 27/46
(52) U.S. Cl. .............................. 359/559; 359/34; 359/35; 359/894; 385/37
(58) Field of Search ...................... 359/894, 34, 35, 359/559, 572, 29, 27, 30, 1, 833; 385/37

(56) References Cited

U.S. PATENT DOCUMENTS

| | | | |
|---|---|---|---|
| 3,073,210 | * 1/1963 | Packard | 359/833 |
| 4,093,339 | * 6/1978 | Cross | 359/34 |
| 4,381,137 | * 4/1983 | Berg et al. | 385/33 |
| 4,530,600 | 7/1985 | Lopez . | |
| 4,778,263 | 10/1988 | Foltyn . | |
| 4,947,413 | 8/1990 | Jewell et al. . | |
| 5,048,938 | 9/1991 | Hizny . | |
| 5,059,013 | 10/1991 | Jain . | |
| 5,090,795 | * 2/1992 | O'Meara et al. | 359/240 |
| 5,090,798 | 2/1992 | Kphayakawa . | |
| 5,104,209 | 4/1992 | Hill et al. . | |
| 5,204,773 | 4/1993 | Guida . | |
| 5,272,501 | 12/1993 | Nishi et al. . | |
| 5,309,260 | 5/1994 | Mizrahi et al. . | |
| 5,311,606 | * 5/1994 | Asakura et al. | 359/833 |
| 5,323,267 | 6/1994 | Galarneau et al. . | |
| 5,331,466 | 7/1994 | Van Saarloos . | |
| 5,357,365 | 10/1994 | Ipposhi et al. . | |
| 5,408,553 | * 4/1995 | English, Jr. et al. | 385/36 |
| 5,601,733 | 2/1997 | Partlo . | |
| 5,616,159 | 4/1997 | Araujo et al. . | |

FOREIGN PATENT DOCUMENTS

| | | |
|---|---|---|
| 0 250 147 | 12/1987 | (EP) . |
| 0 636 586 | 2/1995 | (EP) . |
| 2 146 786 | 4/1985 | (GB) . |
| WO 96/37767 | 11/1996 | (WO) . |
| WO 97/14987 | 4/1997 | (WO) . |

OTHER PUBLICATIONS

Ibsen http://wwwibsen.dk/home/pm₁₃technology.htm, Feb. 14, 1997, Phase masks—Technology, Phase masks—Introduction, Phase masks—Applications, Welcome to the home of Diffractive Optics—Ibsen Structures A/S.

Fused Silica Brochure, Corning Incorporated, Jun. 1993, Excimer Grade Fused Silica.

* cited by examiner

Primary Examiner—Jon Henry
(74) Attorney, Agent, or Firm—Edward F. Murphy; Svetlana Z. Short

(57) ABSTRACT

The invention comprises a spatial filter and a method of spatially filtering a laser beam, particularly a high power laser beam. The inventive spatial filter and method of use is especially suited for use in an optical system for writing index gratings in optical waveguides. The invention provides a method of writing gratings in optical waveguide fiber that results in improved grating performance.

23 Claims, 6 Drawing Sheets

SPATIAL FILTER FOR HIGH POWER LASER BEAM

This application claims priority to U.S. application Ser. No. 60/047,859, filed on May 29, 1997, the contents of which are herein incorporated by reference.

FIELD OF THE INVENTION

The present invention relates to spatial filters. More particularly the present invention relates to spatial filters for laser beams. While the invention is subject to a wide range of applications, it is especially suited for use in an optical system for writing index gratings in optical waveguides.

BACKGROUND OF THE INVENTION

Soon after the development of practical laser sources, laser beams have been used in industrial applications. Laser beams are currently used to induce refractive index changes in optical waveguide glass and particularly glass used in optical fibers. Index gratings are written into germano-silicate glass optical fibers with interference patterns formed by interfering ultraviolet laser beams. Periodic refractive index changes are induced by the interference pattern resulting in index gratings being formed or written in the fiber. Fiber Bragg gratings and long period fiber gratings are two examples of index gratings that are produced in optical fiber and are utilized in the transmission of optical telecommunication signals. Fiber Bragg gratings can be utilized as selective wavelength reflecting filters in the transmission of light through optical fibers. The spacing of the index gratings in the optical fiber is to provide for the reflection of a particular range of wavelengths while allowing other wavelengths to pass through the index grating without being reflected. The quality of previously produced Fiber Bragg gratings has been hindered by a high level of unwanted reflectivity sidelobes. Reflectivity sidelobes occur when wavelengths of light outside the intended high reflectivity wavelength band are reflected by the grating instead of being properly transmitted through the grating.

SUMMARY OF THE INVENTION

Accordingly, the present invention is directed to a method and apparatuses that substantially obviates one or more of the problems due to the limitations and disadvantages of the related art.

Features and advantages of the invention will be set forth in the description which follows, and in part will be apparent from the description, or may be learned by practice of the invention. The objectives and other advantages of the invention will be realized and attained by the apparatuses, systems, and methods particularly pointed out in the written description and claims hereof as well as the drawings.

To achieve these and other advantages and in accordance with the purpose of the invention, as embodied and broadly described, the invention includes a spatial filter for high power density laser beams. The high power density laser beam spatial filter is comprised of light diverting members. In another aspect, the invention includes a method of spatially filtering a laser beam including the step of providing a Fourier transformed (focused) laser beam having low spatial frequencies which are a target of the invention and unwanted high spatial frequencies. The method further includes the step of nonabsorptively diverting the high spatial frequency portion of the Fourier transformed laser beam, said high spatial frequency portion comprised of the unwanted high spatial frequencies, away from the low spatial frequency portion of the Fourier transformed laser beam, said low spatial frequency portion comprised of the targeted low spatial frequencies, to produce a low spatial frequency laser beam. In another aspect, the invention includes a spatial filter for a high power density laser beam, said laser beam having high spatial frequencies and low spatial frequencies, the spatial filter comprises a means for nonabsorptively diverting said high spatial frequencies away from said low spatial frequencies. The invention includes a spatial filter comprised of a means for nonabsorptively diverting an outer portion of a laser beam to leave an inner portion of the laser beam with a smooth beam profile. In another aspect, the invention includes a method of making a grating which includes the steps of producing a laser beam and focusing the laser beam in one dimension with a Fourier transforming optical member, such as a lens, to form a line focused laser beam having a central axis. The method further includes the steps of nonabsorptively diverting an outer portion (high spatial frequencies) of the line focused laser beam away from the focus line and the low spatial frequencies of the laser beam, with a nonabsorptive reflecting surface, preferably with total internal reflection, in order to form a one dimension spatially filtered laser beam and then forming an interference pattern with this spatially filtered laser beam to make a grating particularly in an optical waveguide, and more particularly an optical waveguide fiber.

It is to be understood that both the foregoing general description and the following detailed description are exemplary and explanatory and are intended to provide further explanation of the invention as claimed. The accompanying drawings are included to provide a further understanding of the invention and are incorporated in and constitute a part of this specification, illustrate embodiments of the invention and together with the description serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

DETAILED DESCRIPTION OF THE INVENTION

Figure 1:
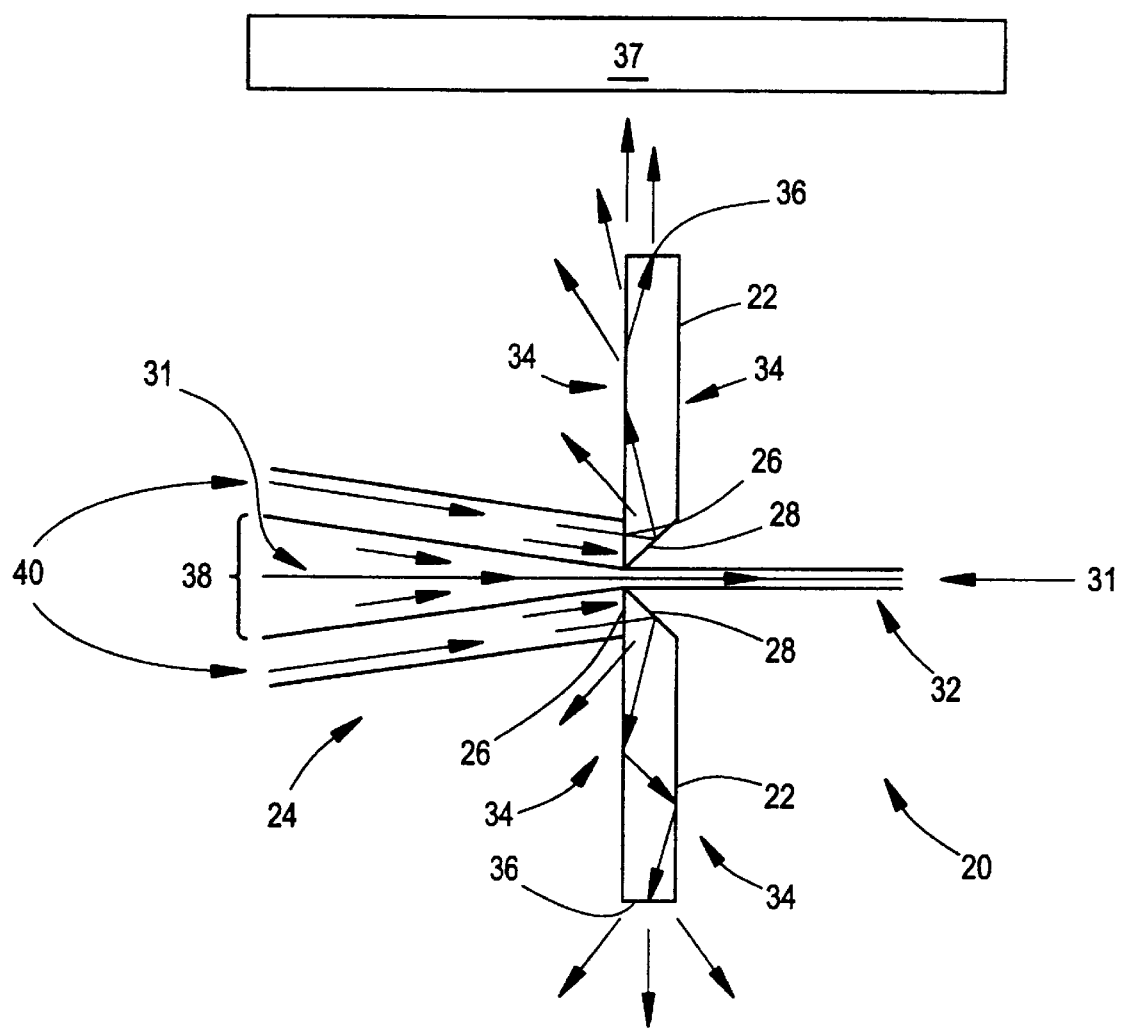
FIG. 1 illustrates a spatial filter of the invention with solid arrows representing light.

While investigating methods of making improved refractive index gratings in optical waveguide fibers, the inventors encountered problems related to the destructive power of the laser beams and laser light energy concentrations along the optical system train they used in writing gratings in optical waveguide fibers.

In writing refractive index gratings in optical waveguides, such as single mode optical fiber comprised of a germanium doped silica core and a silica cladding which guides light due to the index of refraction difference between the core and the cladding, it is beneficial to use very intense laser light in the ultraviolet wavelengths. A high power ultraviolet laser beam is preferred in the writing of gratings in optical waveguide fibers in that it is effective in inducing refractive index changes in the glass and efficient in that less exposure time is required to produce the refractive index change sought.

At some point along the optical train used in the making of gratings, high power density laser beams may be formed which have a power density (fluence level) greater than 0.5 joules/cm$^2$, and potentially greater than 1.0 joules/cm$^2$. Focusing a laser beam increases the power density level and such high power density laser beams can be particularly destructive to elements of an optical system and method.

Gratings are made in an optical fiber by interfering two ultraviolet laser beams incident on the waveguide. An ultraviolet beam may be produced from a laser and split into two beams which when recombined form an interference pattern which will produce a grating in the optical fiber by inducing refractive index changes in accord with the light exposure. Interference patterns may be formed using known interfering means which incorporate a means of splitting a light beam and then interfering the split beams by recombination to form periodic peaks and valleys due to constructive and destructive interference of the beams. A convenient means of forming interference patterns to make gratings is to transmit the ultraviolet laser beam through a periodic phase shift mask.

The inventors have found that improved gratings can be formed in optical waveguides if a laser beam of improved quality is utilized in the making of the gratings. Improved laser beam quality and improved gratings can be obtained by spatial filtering the laser beam to remove high spatial frequencies prior to forming the interference pattern. Standard methods of spatial filtering a laser beam by focusing the beam and placing an aperture formed in an opaque absorptive material at the focus to produce a smooth intensity profile laser beam have been found not to be practical using the high power density laser beams needed for the effective making of gratings in optical fiber. When such an absorptive opaque blocking spatial filter is used in the making of a grating, the high power density of the ultraviolet laser beam destroys the absorptive opaque blocking material of the spatial filter. With a standard spatial filter, the air space aperture in the absorptive spatial filter material allows the low spatial frequencies of the focused laser beam to pass through while the high spatial frequencies of the focused laser beam are at least partially absorbed and scattered by the absorptive material, such as nontransmissive steel or other opaque blocking materials. When used with high power density laser beams such a spatial filter is quickly rendered useless by the ablation of the absorptive material by the absorbed high spatial frequencies and must be replaced. Polishing the surface of these opaque and nontransmissive materials may improve their reflectivity but absorptive interactions between their surface and the light result in destruction of the material when used with high power density levels.

The inventors have developed a nonabsorptive spatial filter. The inventive high power density laser beam spatial filter and system thereof utilizes nonabsorbing transparent light diverting members.

Reference will now be made in detail to the present preferred embodiments of the invention, examples of which are illustrated in the accompanying drawings.

The exemplary embodiment of the present invention is shown in FIG. 1 and is designated generally by reference numeral 20. The invention provides a high power density laser beam spatial filter comprised of a light diverting member, wherein said diverting member is comprised of a transparent and nonabsorptive optical material, preferably fused silica. Preferably the diverting member is comprised of a transparent optical material having a reflective surface and a nonreflective surface, preferably wherein a high spatial frequency light of an outer portion of a laser beam having a central axis is nonabsorptively diverted away from said central axis of said laser beam with said reflective surface.

Figure 2:
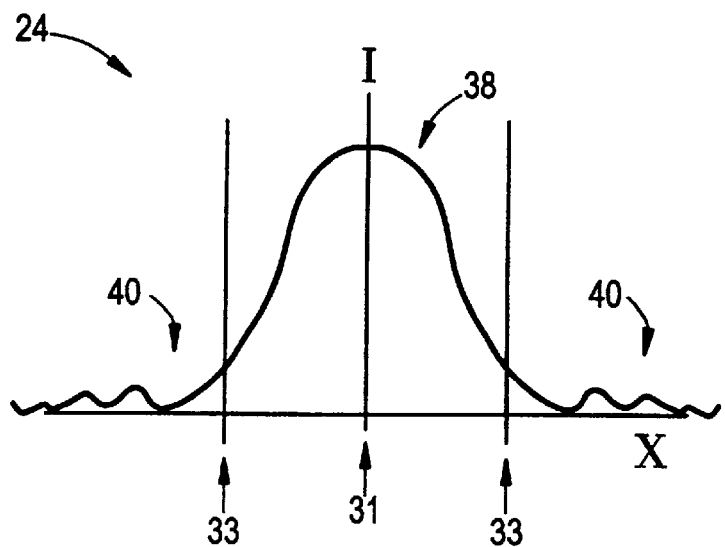
FIG. 2 illustrates the spatial frequency distribution of a Fourier transformed laser beam.

FIG. 1 illustrates the interaction between Fourier transformed laser beam 24 very near the focus point of the lens that has Fourier transformed laser beam 24 and very near light diverting members 22. In FIG. 1, Fourier transformed laser beam 24 very near light diverting members 22 is shown as having a central portion 38 comprised of the wanted low spatial frequencies that are allowed to pass through spatial filter 20 and an outer portion 40 comprised of the unwanted high spatial frequencies which are nonabsorptively diverted by light diverting members 22. FIG. 2 illustrates the distribution of the spatial frequencies of laser beam 24 with the Y axis representing intensity (I) and the X axis representing displacement (X) from the central axis 31 of laser beam 24. In FIG. 2, the wanted portion of Fourier transformed laser beam 24 comprised of the low spatial frequencies 38 is shown separated from the unwanted portion comprised of the high spatial frequencies 40 by dividing lines 33. As shown by dividing lines 33, the selection/rejection border between the low spatial frequencies and the high spatial frequencies can be varied to some degree. Dividing lines 33 depict the placement of light diverting members 22 relative to Fourier transformed laser beam 24 and its central axis 31.

As embodied herein and referring to FIG. 1 the high power density laser beam spatial filter 20 includes light diverting members 22. Light diverting members 22 may be planar waveguides. Light diverting members 22 are comprised of a transparent highly nonabsorptive optical material. Light diverting members 22 are made from an optical material which has negligible absorption to the wavelengths of the laser beam that is being spatially filtered. The optical material should be transparent to the laser beam wavelengths it is to be used with and accordingly have a high transmission rate at the laser beam wavelength. By nonabsorptive it is meant that the light diverting member absorbs such a small amount of the incident laser light that the light diverting member is not appreciably damaged or disturbed. Preferably the light diverting member is highly transparent to the wavelengths of the laser light. Preferably the light diverting member is comprised of an optical material having a high transmittance at the wavelength of the laser light. Preferably the light diverting member is comprised of a material having optical properties such that in a 10 micron thick slice less than 63% of the incident light is absorbed, more preferably less than 30% of the light is absorbed, more preferred less than 10% of the light is absorbed, and even more preferred less than 1% of the light is absorbed. The absorptivity of the nonabsorptive light diverting member is very low (less than 1%) when measured as the fraction of the radiant energy falling upon the member which is absorbed or transformed into heat. Absorptive blocking materials such as polished metal surfaces absorb a larger amount of the incident radiant energy, with this absorption resulting in damage to the absorptive material. An optically polished stainless steel surface is absorptive compared to the nonabsorptive light diverting members of the invention. The preferred light diverting member 22 nonabsorptive optical material is fused silica, particularly when used in the writing of gratings in optical waveguides with an ultraviolet laser beam. A high quality ultraviolet grade fused silica which is resistant to laser damage is the preferred nonabsorptive optical material. It is preferred to use an ultraviolet transparent fused silica such as an Excimer Grade Fused Silica which has external transmittance of greater than 90% (preferably greater than 92%) at ultraviolet wavelengths greater than 200 nm (200–400 nm) for a 1 cm thickness and which includes surface reflection losses. Preferably the optical material, such as fused silica, has an internal transmission at the laser light wavelength of at least 99%, preferably at least 99.5%, and more preferably at least 99.7%. Light diverting members 22 include a nonreflective surface 26 and reflective surface 28. As depicted by the arrows, light entering diverting member 22 through nonreflective surface 26 is reflected by reflective surface 28 via total internal reflection and is diverted away from the central axis of laser beam 24 by reflection from reflective surface 28 and the index of refraction difference (refractive index interface) between the optical material of member 22 and its surrounding environment, which is normally atmospheric air or may be a vacuum, evacuated atmosphere, or other gases and mixtures thereof, such as inert gases, such as argon and nitrogen.

As depicted by the arrows, light which enters light diverting member 22 through nonreflective surface 26 is diverted by reflective surface 28 and then transmitted through the optical material of diverting member 22. Light can be transmitted through longitudinal outer surface sides 34 or reflected by longitudinal outer surface sides 34. When light is reflected by longitudinal outer surface sides 34 the light is waveguided to terminal distal end 36 where it exists the waveguiding diverting member 22.

Figure 3:
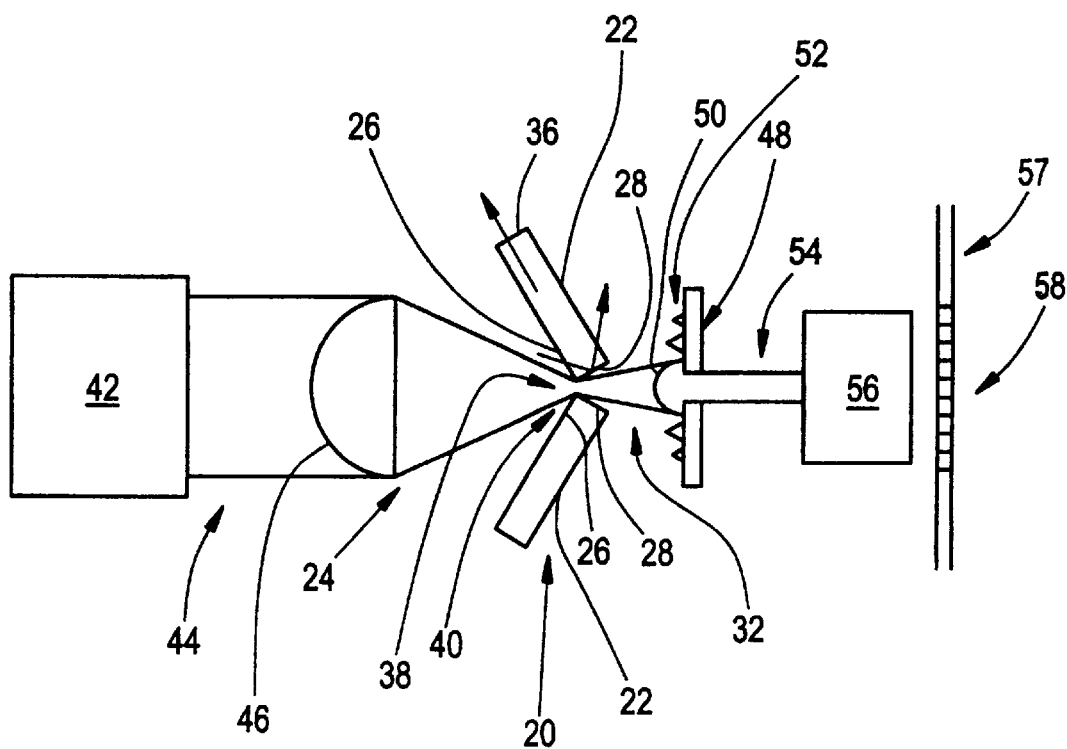
FIG. 3 illustrates an optical system and method of the invention.
Figure 7:
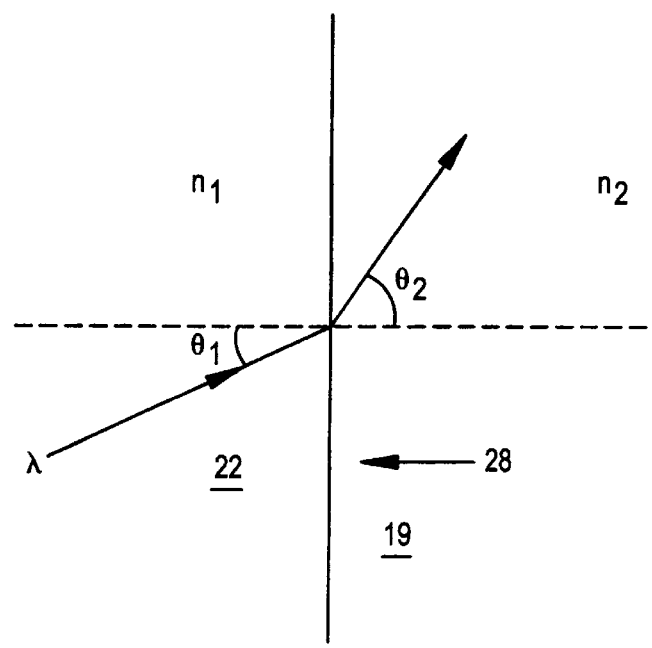
FIG. 7 illustrates the requirements for total internal reflection.

Preferably nonreflective surface 26, which is an entrance for light into light diverting member 22, is a flat polished surface of the optical material. The angle of incidence of the light of laser beam 24 and surface 26 is positioned so that the incident light of laser beam 24 is transmitted through the refractive index interface of surface 26 and its surrounding atmosphere. An example of a nonreflective incident angle is the approximately perpendicular relationship of surface 26 and laser beam 24. Preferably reflective surface 28 and longitudinal outer surface sides 34 of diverting member 22 are flat polished surfaces of the optical material which provide a refractive index interface. Reflective surface 28 is positioned and formed relative to nonreflective surface 26 and the incident light of laser beam 24 that is transmitted through 26 such that the refractive index interface of surface 28 diverts the transmitted incident light. As shown in FIG. 1 angles suitable for total internal reflection of the unwanted high spatial frequencies by light diverting member 22 are utilized, for example approximately a 45° angle between nonreflective surface 26 and reflective surface 28 provides a means for light to enter member 22 and be reflectively diverted away from the central axis of laser beam 24. Another embodiment of spatial filter 20 is shown in FIG. 3, where light diverting members 22 are comprised of rectangular blocks of fused silica. As shown in FIG. 3, the 90° corner of nonreflecting surface 26 and reflecting surface 28 is positioned relative to the incident light so that the outer portion 40 of laser beam 24 is reflected and diverted away. FIG. 7 illustrates the requirements for total internal reflection in light diverting member 22 at the refractive index interface of reflecting surface 28 and surrounding environment 19. Light diverting member 22 is comprised of a transparent optical material having an index of refraction $n_1$ and surrounding environment 19 has an index of refraction $n_2$. In FIG. 7 the solid arrows/lines indicate a light beam of wavelength λ (of high spatial frequency) being transmitted in light diverting member 22 and incident on reflecting surface 28 with $n_1 \sin \theta_1 = n_2 \sin \theta_2$ where $\theta_1$ is the angle of the incident light to the normal of reflecting surface 28. For a minimum angle $\theta_1$ for the on set of total internal reflection in member 22, $\theta_2 = 90°$; so $$\theta_1 = \text{Arcsin}\left(\frac{n_2}{n_1}\right).$$

Total internal reflection will be obtained when $$\theta_1 \geq \text{Arcsin}\left(\frac{n_2}{n_1}\right).$$

Index of refraction $n_1$ and $n_2$ depend on the optical properties of light diverting member 22 and surrounding environment 19, which may be a gas atmosphere or vacuum, and the wavelength (λ) of the light. For a 250 nm wavelength (λ) of incident light, light diverting member comprised of fused silica, and surrounding environment of standard atmospheric air, $n_1=1.5$ and $n_2=1$, so $$\theta_1 = \text{Arcsin}\left(\frac{1}{1.5}\right) \cong 42°.$$

Total internal reflection in light diverting member 22 made of fused silica at reflecting surface 28 and its interface with surrounding atmosphere air 19 occurs with a 250 nm wavelength (λ) when $\theta_1 \geq 42°$. It is preferred to use a silica to standard atmospheric air interface for obtaining total internal reflection yet appropriate optical coatings can be used to improve the nonreflectivity of surface 26 if needed. Light from the outer portion of laser beam 24 enters deflecting member 22 through nonreflecting surface 26 and is diverted by the refractive index interface of reflecting surface 28. Light diverting member 22 may guide the incident light of the outer portion 40 of laser beam 24 away from the central axis 31 of laser beam 24 and filtered laser beam 32, and towards the terminal distal end 36. Terminal distal end 36 provides an exit for light contained within member 22 particularly when member 22 is an optical waveguide. Terminal distal end 36 provides an appropriate refractive index interface to allow transmission of light out of member 22. Terminal end 36 may include a flat polished surface or other optical surface such as a focusing or diffusing surface. Light exiting terminal end 36 and longitudinal outer surface sides 34 are transmitted to an absorptive surface such as a plate 37 which can tolerate absorption of the now lower power density light. Alternatively unwanted exiting light can be further transmitted and disposed of such as by scattering.

Light diverting members 22 of high power density laser beam spatial filter 20 reflects the outer portion 40 which is the unwanted high spatial frequencies of the incident laser beam 24 away from the central portion 38 of incident laser beam 24 and its central axis 31 with filtered laser beam 32. The central portion 38 and filtered laser beam 32 comprises the wanted low spatial frequencies of incident laser beam 24.

A preferred light diverting member 22 for directionally controlling the diverted high spatial frequency light is a planar waveguide designed and positioned relative to laser beam 24 so that light entering nonreflective surface 26 is contained within member 22 by longitudinal outer surface sides 34 and exits terminal distal end 36.

Spatial filter 20 may be comprised of singular or plural light diverting members 22. A spatial filter 20 can comprise a singular light diverting member 22 comprised of an aperture, preferably circular in shape, formed in a transparent nonabsorptive optical material. Such an aperture would include a nonreflecting surface 26 and reflecting surface 28, wherein the central axis 31 and central portion 38 of incident laser beam 24 would pass through the open space and center of the aperture while the outer portion 40 would enter into the light diverting member 22 through nonreflecting surface 26 towards reflecting surface 28 which would divert the unwanted high spatial frequencies of the outer portion 40 away from the center of the aperture and the laser beam central axis 31, preferably utilizing total internal reflection.

The invention further includes a method of spatially filtering a high power density laser beam. The method of spatially filtering a laser beam includes providing a laser beam comprised of a low spatial frequency portion and a high spatial frequency portion; and nonabsorptively diverting said high spatial frequency portion away from said low spatial frequency portion. Preferably the step of providing a laser beam further comprises Fourier transforming the laser beam which includes focusing a high power density laser beam in one dimension. Preferably the step of nonabsorptively diverting comprises reflecting said high spatial frequency portion and transmitting said high spatial frequency portion in a transparent optical material. A preferred method of Fourier transforming the laser beam in one dimension is to focus with a cylindrical lens or other means for focusing a beam into a line. Fourier transforming the laser beam provides at and near the focus point an inner portion of low spatial frequencies. The step of diverting the high spatial frequency portion further comprises nonabsorptively reflecting the outer high spatial frequency portion away from the inner low spatial frequency portion. The preferred method of diverting the high spatial frequency portion includes reflecting the light of the high spatial frequency portion with a high quality transparent nonabsorptive optical material, such as fused silica. Preferably a transparent member having a nonabsorptive reflecting surface is positioned relative to the incident high spatial frequency portion so that the high spatial frequency portion is separated from the low spatial frequency portion.

The invention includes a spatial filter and spatial filtering system comprised of a means for nonabsorptively diverting an outer portion of said laser beam. The preferred means for nonabsorptively diverting away an outer portion includes a means for reflecting away light in the outer portion of the laser beam while not diverting light in the inner portion of the laser beam. The invention provides a spatial filter for a laser beam having high spatial frequencies and low spatial frequencies, said filter comprising a means for nonabsorptively diverting said high spatial frequencies away from said low spatial frequencies. Preferably the means for nonabsorptively diverting further comprises a transparent optical member having a means for reflecting said high spatial frequencies and the means for reflecting comprises a refractive index interface that provides total internal reflection.

The invention further includes a method of making a grating in an optical waveguide, preferably a Bragg grating in an optical waveguide fiber. The inventive method of making a grating includes the step of producing a laser beam. This method includes the steps of Fourier transforming by focusing the laser beam in a first one dimension to form a line focused laser beam having a central axis and nonabsorptively diverting an outer portion of the line focused laser beam away from the line focused laser beam central axis using a nonabsorptive transparent reflecting member in order to form a one dimension spatially filtered laser beam. This method further includes forming an interference pattern with the spatially filtered laser beam to make a grating. The preferred method of making an index grating in an optical waveguide fiber includes using an ultraviolet laser.

The method of making a grating further includes the steps of focusing the one dimension spatially filtered laser beam in a second one dimension in order to form a secondly line focused laser beam and nonabsorptively diverting an outer portion of the secondly line focused laser beam with a nonabsorptive transparent reflecting member to form a two dimension spatially filtered laser beam and forming an interference pattern with the two dimension spatially filtered laser beam to make a grating.

Preferably the reflecting member used to divert the outer portion of the laser beam is formed from fused silica, which is transparent to the wavelengths of the laser beam.

The preferred method of producing a laser beam includes producing a high power density laser beam, and more preferably an ultraviolet high power density laser beam.

Gratings 58 were made in optical waveguide fiber 57 using the method and apparatus system shown in FIG. 3. Means 42 for providing a high power density laser beam 44 included a XeF (351 nm) laser which pumped a dye laser with coumarin 480 nm blue dye which produced a 480 nm wavelength laser beam which drove a frequency doubling crystal to produce a 240 nm wavelength laser beam. Laser beam providing means 42 further included a four prism beam separator filter which filtered out any 480 nm light emerging from the frequency doubling crystal to provide a high power density ultraviolet laser beam 44 with a 240 nm wavelength. An alternative means or Providing a high power density ultraviolet laser been would be an excimer laser such as a 248 nm KrF Excimer laser. Means 46 for Fourier transforming and focusing laser beam 44 comprised a cylindrical lens. Cylindrical lens 46 focused laser beam 44 in one dimension to provide a Fourier transformed line focused beam for spatial filter 20 at the air gap space between light diverting members 22. Lens 46 provided a Fourier transformed line focused laser beam 24 comprised of a high spatial frequency outer portion 40 and a low spatial frequency inner portion 38 at and near the focus point and spatial filter 20. Spatial filter 20 was comprised of light diverting members 22 which were high purity ultraviolet excimer grade fused silica rectangular blocks. Rectangular block shaped light diverting members 22 are preferred because of the ease of fabricating an optical rectangular block member having 90° edges. Light diverting members 22 were positioned relative to line focused laser beam 24 so that the high spatial frequency laser light of outer portion 40 was transmitted through nonreflective surface 26 and diverted by reflective surface 28 as depicted by the arrows. The low spatial frequency laser light of inner portion 38 was transmitted through the air gap space between the corners of light deflecting members 22 formed by nonreflecting surface 26 and reflecting surface 28. Light diverting members 22 were rectangular blocks having approximate dimensions of long length of 3 cm, short length of 2 cm, and thickness of 0.5 cm. Light diverting members may have a thickness ranging from about 1 mm (0.1 cm) to 2 cm, and appropriate length and width for the laser beam dimension and mounting with brackets on an optical table. Spatially filtered laser beam 32 which emerged from spatial filter 20 included a high power density central lobe 50 and low power density outer peripheral lobes 52. Peripheral lobes 52 were absorbed by beam blocker 48 which was comprised of standard BK-7 optical glass which was able to tolerate the absorption of the low power density peripheral lobes 52. One dimension spatially filtered beam 54 was transmitted to means 56 for forming an interference pattern. Means 56 for forming an interference pattern comprised an interferometer which split laser beam 54 into two separate beams and then recombined the two beams to form an interference pattern. Interference pattern forming mean 56 could also comprise other means for forming an interference pattern in optical waveguide 57 such as with a phase mask. An interference pattern was formed on optical waveguide 57 using high power density one dimension spatially filtered laser beam 54 having approximately a 200 mJ/pulse/cm$^2$ fluence level. Optical is waveguide 57 comprised segments of CORNING® SMF/DS™ optical waveguide fiber, it is preferred that such a fiber be loaded with $H_2$ to improve its photosensitivity.

Figure 4:
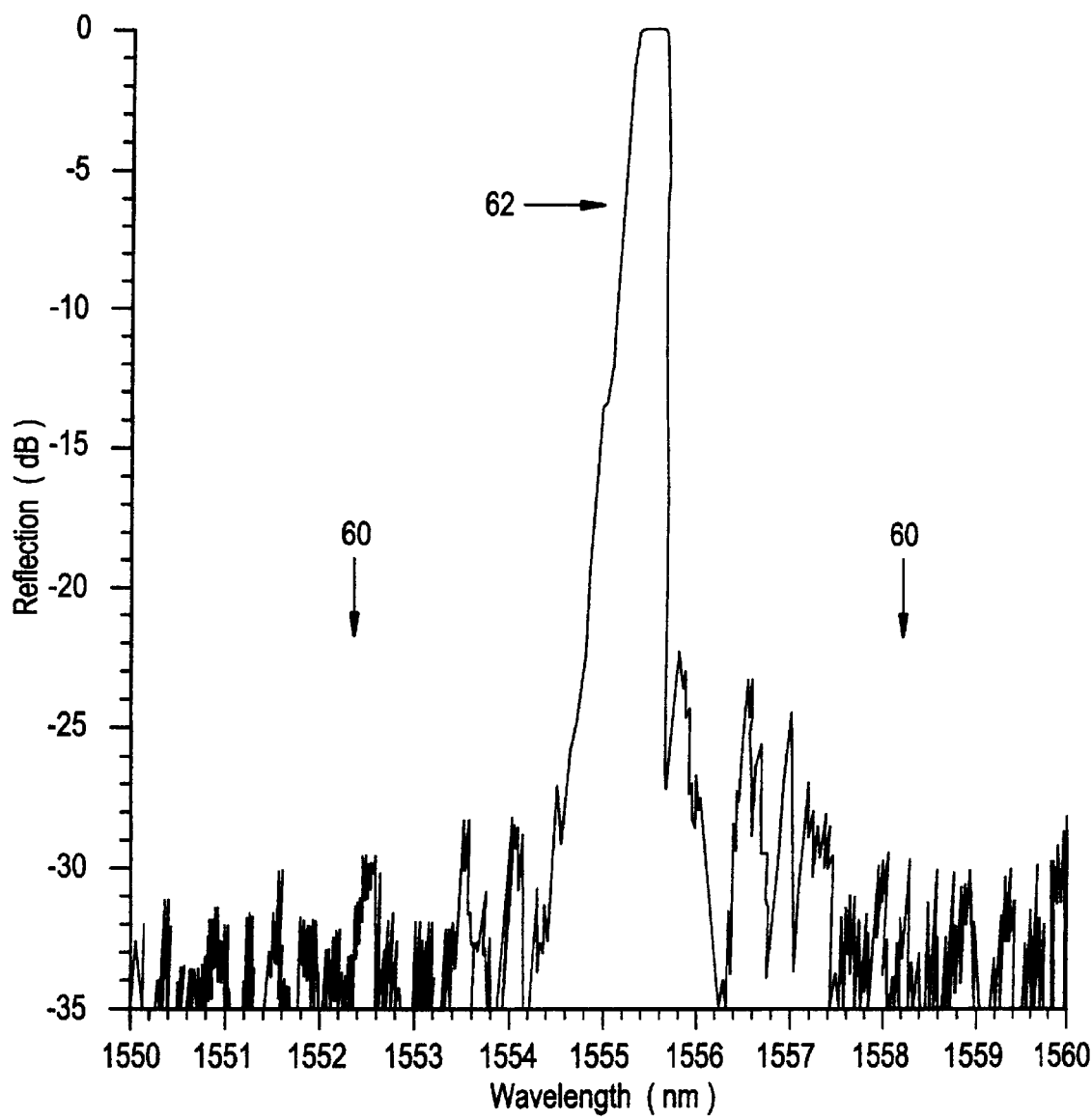
FIG. 4 is a Reflection Spectrum of a fiber Bragg grating.
Figure 5:
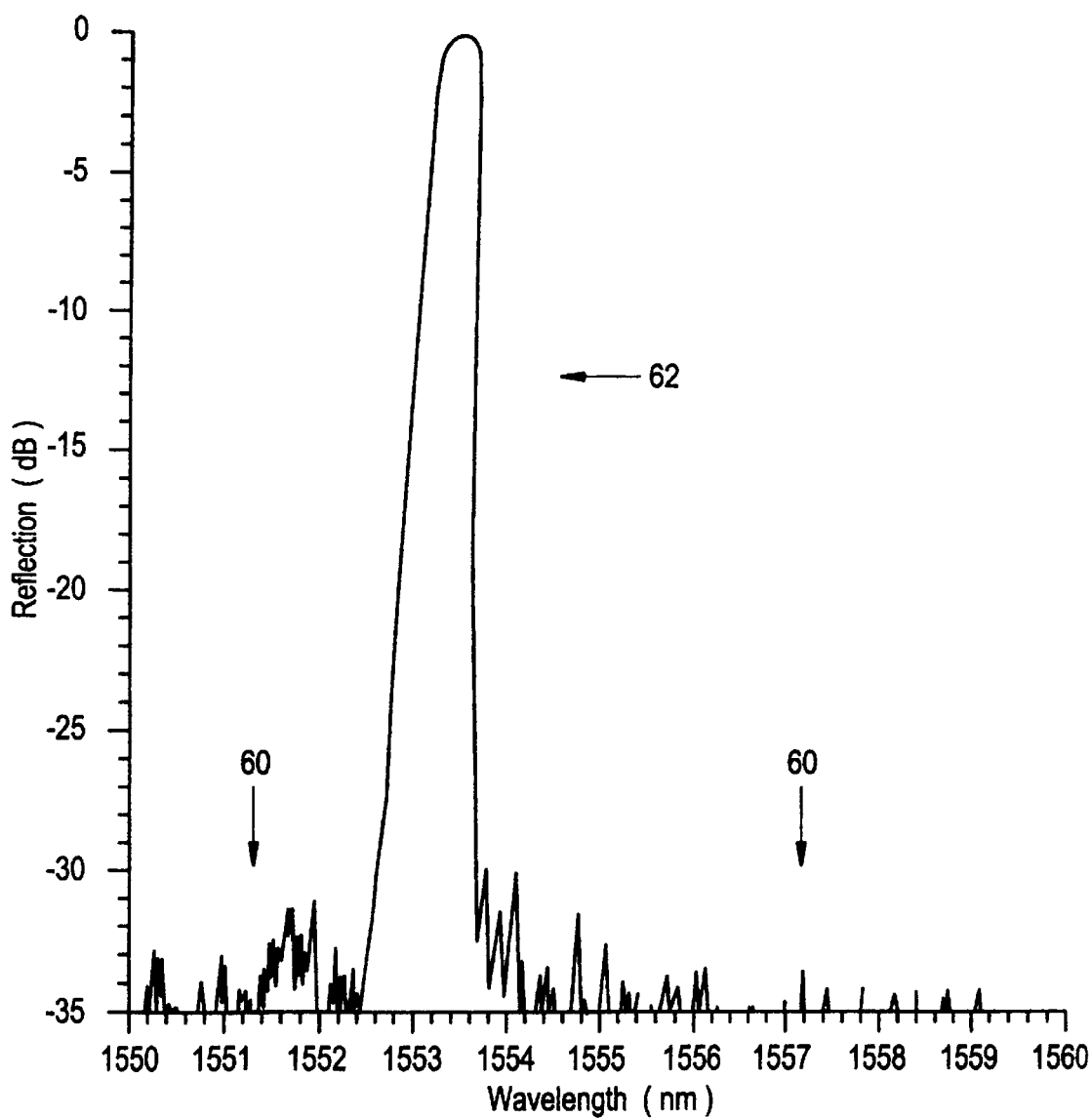
FIG. 5 is a Reflection Spectrum of a fiber Bragg grating produced by the invention.
Figure 8:
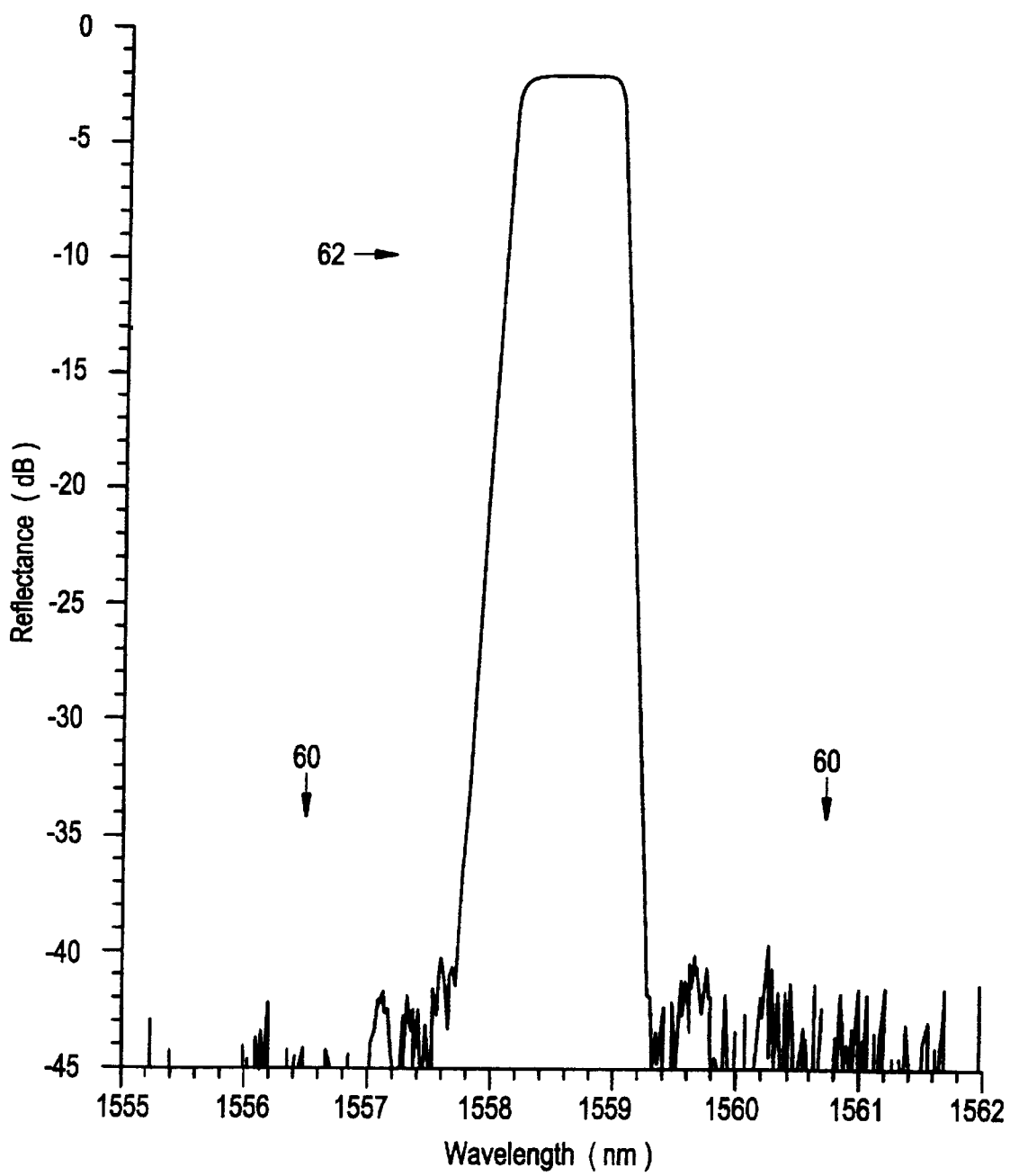
FIG. 8 is a Reflection Spectrum of a fiber Bragg grating produced by the invention.

Fiber Bragg gratings were made in optical fiber segments to compare the difference between providing a spatially filtered laser beam and a nonspatially filtered laser beam to interference pattern forming means 56. FIG. 4 is the Reflection Spectrum for the fiber Bragg grating made using a nonspatially filtered laser beam. FIG. 5 is the Reflection Spectrum for the fiber Bragg grating made using the inventive spatial filter to produce a spatially filtered laser beam. A comparison of the spatial filter produced grating of FIG. 5 and the nonspatial filter produced grating of FIG. 4 shows that the inventive reflective nonabsorptive transparent spatial filter and method of using with a high power density ultraviolet laser beam produces an optical waveguide grating with a reduced level of unwanted reflectivity sidelobes 60 outside the wanted high reflectivity band 62. The reduced quantity and magnitude of reflectivity sidelobes 60 in FIG. 5 is superior to the sidelobes 60 in FIG. 4. FIG. 8 is the Reflection Spectrum for an inventive fiber Bragg grating made using the inventive spatial filter to produce a spatially filtered laser beam, in accordance with the invention, with one side of the 480 nm blue wavelength beam clipped off with a silica block prior to entering the frequency doubling crystal. The spatial filter produced grating of FIG. 8 is very good in that the unwanted reflectivity sidelobes 60 outside the wanted high reflectivity band 62 are extremely low (less than −39 dB). In inventive fiber Bragg grating of FIG. 8, there are no sidelobes 60, with reflectance greater than −39 dB, outside of the high reflectivity band 62 which has a bandwidth of about 1.5 nm. The invention includes such an inventive fiber Bragg grating having a high reflectivity band wherein said grating is free of sidelobes, outside of the band, that have a reflectivity greater than −39 dB. The invention further includes the method of making such an inventive fiber Bragg grating, wherein the method of making the fiber Bragg grating includes the step of spatially filtering a laser beam so as to produce a fiber Bragg grating that has sidelobes with a reflectivity less than −39 dB.

Figure 6:
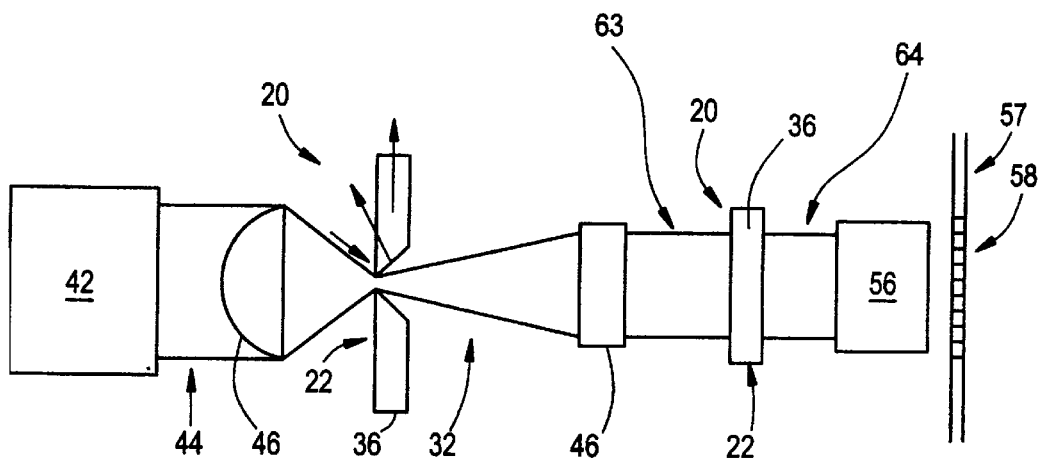
FIG. 6 illustrates an optical system and method of the invention.

A further embodiment of the invention is disclosed in FIG. 6 which provides an apparatus system and method of making a grating 58 in a waveguide 57 using a two dimension completely spatially filtered laser beam 64. One dimension spatially filtered laser beam 32 is spatially filtered in its other dimension with second focusing means 46 for Fourier transforming the laser beam and second nonabsorptive transparent spatial filtering means 20. One dimension spatially filtered laser beam 32 is focused in a second one dimension by a second cylindrical lens 46 which has been rotated 90° relative to first cylindrical lens 46 to form secondly line focused laser beam 63. Secondly line focused laser beam 63 is spatially filtered by second spatial filter 20 which has been rotated 90° relative to first spatial filter 20 so as to matchup with secondly line focused laser beam 63. Two dimension spatially filtered laser beam 64 is transmitted to means 56 for forming an interference pattern. Index grating 58 is then written in optical waveguide 57 utilizing two dimension spatially filtered high power density ultraviolet laser beam 64. A fiber Bragg grating made with such a spatially filtered laser beam should have a further improved quality in reduced levels of reflectivity sidelobes.

It will be apparent to those skilled in the art that various modifications and variations can be made in the method and apparatus of the present invention without departing from the spirit or scope of the invention. Thus, it is intended that the present invention cover the modifications and variations of this invention provided they come within the scope of the appended claims and their equivalents.

What is claimed is:

1. A laser device comprising: (i) a high power laser source providing a high power laser beam including high spatial frequencies and low spatial frequencies; (ii) a beam converging component focusing said beam onto a focal plane such that said low spatial frequencies are located on one part of said focal plane and said high frequencies are location on another part of said focal plane; and (iii) a laser beam spatial filter comprised of a non-absorptive, non-roughened light diverting member situated in said beam in a location such that high spatial frequency portion of said laser beam is diverted away from the low spatial frequency portion of said laser beam, said light diverting member including at least one refractive surface and at least one reflective surface.

2. The spatial filter of claim 1 wherein said diverting member is comprised of a nonabsorptive optical material.

3. The spatial filter of claim 1 wherein said diverting member is comprised of a transparent optical material.

4. The spatial filter of claim 1 wherein said diverting member is comprised of fused silica.

5. The spatial filter of claim 1, wherein said reflective surface utilizes total internal reflection.

6. The spatial filter of claim 1 wherein said diverting member is comprised of a transparent optical material and a nonreflective surface.

7. The spatial filter of claim 5 wherein a high spatial frequency light of an outer portion of a laser beam having a central axis is nonabsorptively diverted away from said central axis of said laser beam with said reflective surface.

8. A method of spatially filtering a laser beam, comprising:
   (i) providing a laser beam, said laser beam being comprised of a low spatial frequency portion and a high spatial frequency portion; and
   (ii) nonabsorptively diverting said high spatial frequency portion away from said low spatial frequency portion by utilizing at least one non-roughened surface and at least one reflective surface.

9. The method of claim 8, wherein the step of providing a laser beam further comprises Fourier transforming the laser beam.

10. The method of claim 8, wherein the step of providing a laser beam further comprises focusing a high power density laser beam in one dimension.

11. The method of claim 10, wherein the step of nonabsorptively diverting comprises first refracting and then reflecting said high spatial frequency portion.

12. Method of claim 11, wherein the step of nonabsorptively diverting further comprises transmitting said high spatial frequency portion in a transparent optical material.

13. A spatial filter for a laser beam, said laser beam having high spatial frequencies and low spatial frequencies, said filter comprising at least one reflective surface and at least one non-roughened refractive surface positioned such that said filter nonabsorptively diverts said high spatial frequencies away from said low spatial frequencies.

14. The spatial filter of claim 13 wherein said reflecting surface reflects only said high spatial frequencies.

15. The spatial filter of claim 14 wherein said means for reflecting comprises a refractive index interface that provides total internal reflection.

16. A method of making a grating, comprising the steps of:

producing a laser beam;

focusing the laser beam in a first one dimension to form a line focused laser beam having a central axis;

nonabsorptively diverting an outer portion of the line focused laser beam away from the line focused laser beam central axis with a reflecting member to form a one dimension spatially filtered laser beam;

forming an interference pattern with said spatially filtered laser beam to make a grating.

17. The method of claim 16, further comprising the steps of:

focusing the one dimension spatially filtered laser beam in a second one dimension to form a secondly line focused laser beam;

nonabsorptively diverting an outer portion of the secondly line focused laser beam with a reflecting member to form a two dimension spatially filtered laser beam;

forming an interference pattern with said two dimension spatially filtered laser beam to make a grating.

18. The method of claim 16 wherein said reflecting member is comprised of fused silica.

19. The method of claim 16 wherein said step of producing a laser beam further comprises producing a high power density laser beam.

20. The method of claim 19 wherein said step of producing a high power density laser beam further comprises producing an ultraviolet laser beam.

21. The method of claim 16 wherein said step of forming an interference pattern with said spatially filtered laser beam to make a grating further comprises forming an interference pattern in an optical waveguide to produce a change of refractive index in said optical waveguide.

22. A method of making grating, comprising the steps of:

producing a laser beam;

focusing the laser beam in a first one dimension to form a line focused laser beam having a central axis;

nonabsorptively diverting an outer portion of the line focused laser beam away from the line focused laser beam central axis with a reflecting member to form a one dimension spatially filtered laser beam;

forming an interference pattern with said spatially filtered laser beam to make a fiber Bragg grating wherein the fiber Bragg grating is free of sidelobes having a reflectivity greater than −39 dB.

23. A fiber Bragg grating having a high reflectivity band and said grating has a plurality of sidelobes outside of said high reflectivity band wherein said sidelobes outside of said band have a reflectivity less than −39 dB.

* * * * *